US008917062B2

United States Patent
Lu et al.

(10) Patent No.: US 8,917,062 B2
(45) Date of Patent: Dec. 23, 2014

(54) CHARGING CONTROL CIRCUIT

(75) Inventors: Chien-Ping Lu, Tainan (TW); Nien-Hui Kung, Hsinchu (TW); Li-Wei Lee, New Taipei (TW); Chia-Hsiang Lin, Taipei (TW); Chen-Hsiang Hsiao, Pingzhen (TW); Ko-Ching Su, Hsinchu (TW)

(73) Assignee: Richtek Technology Corporation, Hsin-Chu (TW)

( * ) Notice: Subject to any disclaimer, the term of this patent is extended or adjusted under 35 U.S.C. 154(b) by 372 days.

(21) Appl. No.: 13/597,653

(22) Filed: Aug. 29, 2012

(65) Prior Publication Data

US 2014/0062435 A1 Mar. 6, 2014

(51) Int. Cl.
*H02J 7/00* (2006.01)
*H02J 7/16* (2006.01)
*H02J 7/06* (2006.01)

(52) U.S. Cl.
USPC ........... 320/128; 320/127; 320/135; 320/137; 320/151; 320/156; 320/161; 320/163

(58) Field of Classification Search
USPC ......... 320/127–128, 135, 134, 136, 137, 151, 320/156, 161, 163
See application file for complete search history.

(56) References Cited

U.S. PATENT DOCUMENTS

| | | | | |
|---|---|---|---|---|
| 6,611,128 | B2* | 8/2003 | Minamiura et al. | 320/134 |
| 6,624,613 | B2* | 9/2003 | Kitagawa | 320/124 |
| 6,707,271 | B2* | 3/2004 | Kitagawa | 320/134 |
| 7,564,220 | B2* | 7/2009 | Niculae et al. | 320/131 |
| 7,710,079 | B2 | 5/2010 | Martin et al. | |
| 8,278,882 | B2* | 10/2012 | Gotou et al. | 320/163 |
| 2007/0176578 | A1* | 8/2007 | Tsugawa et al. | 320/134 |
| 2008/0297114 | A1* | 12/2008 | Chang et al. | 320/134 |
| 2010/0194354 | A1* | 8/2010 | Gotou et al. | 320/163 |

* cited by examiner

*Primary Examiner* — Stacy Whitmore
(74) *Attorney, Agent, or Firm* — Tung & Associates

(57) ABSTRACT

The present invention discloses a charge control circuit for supplying power from an external power source to a first common node and charging a second common node from the first common node. A regulator circuit is coupled between the external power source and the first common node, and a transistor is coupled between the first common node and the second common node. The present invention detects an operation parameter of the transistor and controls an internal voltage source to generate a non-predetermined voltage difference accordingly. When the sum of the voltage at the second common node and the non-predetermined voltage is equal to or higher than the reference voltage, the voltage at the first common node is regulated to a level higher than the voltage at the second common node, and the transistor is in an optimum conductive state.

7 Claims, 4 Drawing Sheets

US 8,917,062 B2

CHARGING CONTROL CIRCUIT

BACKGROUND OF THE INVENTION

1. Field of Invention

The present invention relates to a charge control circuit; particularly, it relates to such charge control circuit which detects an operation of a transistor on the charging path to generate a non-predetermined voltage for optimum control of the charging operation.

2. Description of Related Art

Rechargeable batteries are commonly used to power portable electronic devices. A battery charger for charging such a rechargeable battery is usually required to power the system load and charge the battery at the same time. During such operation to concurrently power the system load and charge the battery, it is a basic requirement that the current should not flow back from the battery to the system load; otherwise the battery can never be fully charged. Therefore, in the design of the conventional battery charger, a predetermined voltage difference is set between the battery charging voltage and the system input voltage. That is, the battery charging voltage is set to be lower than the system input voltage, such that the current will not flow from the battery to the system load during charging operation.

FIG. 1 shows the relationship between the battery charging voltage Vbat and the system input voltage Vsys, as an external power source provides power to the battery charger. As shown in the figure, there is a voltage difference Vos between the battery charging voltage Vbat and the system input voltage Vsys. The voltage difference Vos is a predetermined value set by a designer, which is usually set conservatively to ensure a safe voltage difference between the battery charging voltage Vbat and the system input voltage Vsys. However, in practical operation, it suffices as long as the battery charging voltage Vbat is smaller than the system input voltage Vsys and there is sufficient current in the charging path. Therefore, by setting the voltage difference Vos to a predetermined level, usually the voltage difference is not optimum and if the predetermined voltage difference is larger than required, there will be unnecessary waste of power; if the predetermined voltage difference is too small, there will be insufficient current in the charging path.

Please refer to FIG. 2 for an example of the above-mentioned prior art, which shows a simplified circuit diagram of U.S. Pat. No. 7,710,079. The charger circuit 10 includes a regulator circuit 11, a charge control unit 12, an internal voltage source 14, a transistor Q1, an error amplifier circuit 13, a system load (having a system input voltage Vsys) and a battery charging terminal Vbat. The regulator circuit 11 is coupled to an external power source Vbus and supplies power to a common node N11. The transistor Q1 is coupled between the common nodes N11 and N12. The charge control unit 12 is coupled to the gate G1 of the transistor Q1. The internal voltage source 14 is coupled between the common node N12 and the error amplifier circuit 13 and it generates an voltage difference Vos. The error amplifier circuit 13 includes one negative input terminal and two positive input terminals, wherein the negative input terminal is coupled to the common node N11, and the two positive input terminals are coupled to the internal voltage source 14 and a reference voltage Vref, respectively, wherein the reference voltage Vref corresponds to a voltage level of 3.4V shown in FIG. 1. When the charger circuit 10 is in the charging stage I, the error amplifier circuit 13 compares the voltage level Vsys of the system load with the reference voltage Vref to generate a control signal which controls the voltage supplied by the regulator circuit 11 according to the reference voltage Vref. When the charger circuit 10 is in the charging stage II, the error amplifier circuit 13 compares the voltage level of the system load Vsys with the internal voltage source 14 (the output voltage of the internal voltage source 14 is the sum of the battery charging voltage Vbat and the voltage difference Vos) to generate a control signal which keeps a predetermined voltage difference between the voltage supplied by the regulator circuit 11 and the battery charging voltage Vbat in correspondence with the voltage difference Vos. However, the predetermined voltage difference is not always an optimum voltage as desired. If the predetermined voltage difference is set too large, there will be unnecessary power consumption. If the predetermined voltage difference is set too small, the transistor Q1 will not be completely turned ON.

Therefore, it is desired to prevent the current of the battery from flowing back to the system load under the charging condition, while improving the charging efficiency by reducing the power consumption due to the above-mentioned voltage difference.

SUMMARY OF THE INVENTION

The present invention provides a charge control circuit for effectively improving the charging efficiency to reduce the unnecessary power consumption.

Other objectives and advantages of the present invention can be understood from the disclosure of the specification.

To achieve the objectives mentioned above, from one perspective, the present invention provides a charge control circuit for supplying power from an external power source to a first common node and charging a second common node from the first common node, a regulator circuit being coupled between the external power source and the first common node, and a first transistor being coupled between the first common node and the second common node. The charge control circuit comprises a detecting device, an internal voltage source, a charge control unit, and a first error amplifier circuit. The detecting device detects an operation parameter of the first transistor and controls an internal voltage source to generate a non-predetermined voltage difference accordingly. The charge control unit controls a conductive state of the first transistor. The first error amplifier circuit generates and transmits a control signal to the regulator circuit according to a voltage at the first common node, a sum of a voltage at the second common node and the non-predetermined voltage difference, and a reference voltage, whereby: when the sum of the voltage at the second common node and the non-predetermined voltage difference is smaller than the reference voltage, the voltage at the first common node is regulated to a predetermined level; and when the sum of the voltage at the second common node and the non-predetermined voltage difference is equal to or higher than the reference voltage, the voltage at the first common node is regulated to a level higher than the voltage at the second common node, and the first transistor is in an optimum conductive state.

In one embodiment, the detecting device detects a voltage difference between a drain and a source of the first transistor and controls the internal voltage source to generate the non-predetermined voltage difference accordingly.

In the above-mentioned embodiment, the detecting device preferably includes: a current source, which generates a current proportional to a drain current of the first transistor; a second transistor, which is proportional to the first transistor and is fully conductive, wherein the second transistor is coupled to the current source; and a second error amplifier circuit having two input ends coupled to a drain and a source of the second transistor, respectively, wherein the second error amplifier circuit generates an output signal according to a comparison between its two input ends, for controlling the internal voltage source to generate the non-predetermined voltage difference.

In one embodiment, the detecting device is a voltage difference detection device, wherein the voltage difference detection device detects a gate voltage at a gate of the first transistor and determines a gate-source voltage difference between the gate and a source of the first transistor in order to control the internal voltage source to generate the non-predetermined voltage difference according to the gate-source voltage difference.

In one embodiment, the first error amplifier circuit has input ends coupled to the first common node, the second common node via the internal voltage source, and the reference voltage, respectively, and the first error amplifier circuit has an output end coupled to the regulator circuit.

In one embodiment of the charge control circuit, the first common node is coupled to a system load.

In one embodiment of the charge control circuit, the second common node is coupled to a rechargeable battery.

The objectives, technical details, features, and effects of the present invention will be better understood with regard to the detailed description of the embodiments below, with reference to the drawing.

DESCRIPTION OF THE PREFERRED EMBODIMENTS

Figure 1:
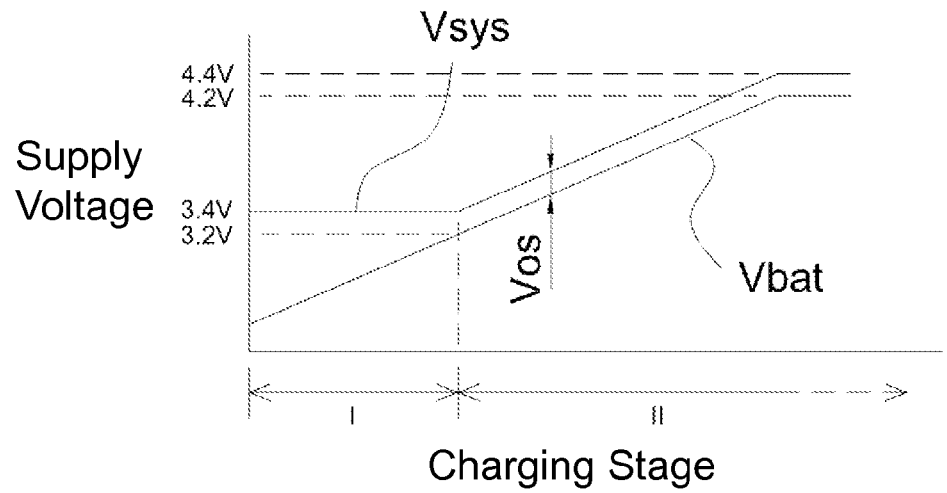
FIG. 1 shows the relationship between the battery charging voltage Vbat and the system input voltage Vsys in the prior art.
Figure 2:
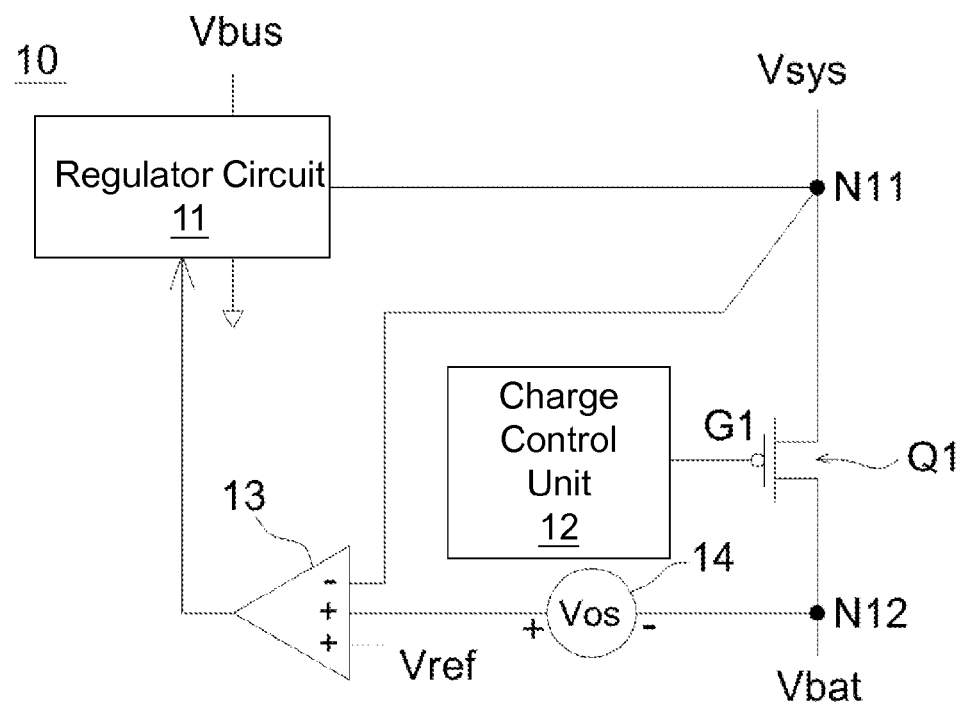
FIG. 2 shows a schematic view of a conventional charge control circuit.

The above and other technical details, features and effects of the invention will be will be better understood with regard to the detailed description of the embodiments below, with reference to the drawings. In the description, the words relate to directions such as "on", "below", "left", "right", "forward", "backward", etc. are used to illustrate relative orientations in the drawings and should not be considered as limiting in any way. The drawings as referred to throughout the description of the present invention are for illustration only, to show the interrelations between the devices and the elements, but not drawn according to actual scale. For example, a circuit which does not substantially influence the primary function can be inserted between any two circuits in the shown embodiments, such as a switch, a level shift circuit, a signal detection circuit, a driver circuit, etc. As one of average skill in the art will further appreciate, the term "coupled", as may be used herein, includes direct connection and indirect connection via another component, device, circuit, or module where, for indirect connection, the intervening component, device, circuit, or module does not modify the information of a signal but may adjust its current level, voltage level, and/or power level.

Figure 3:
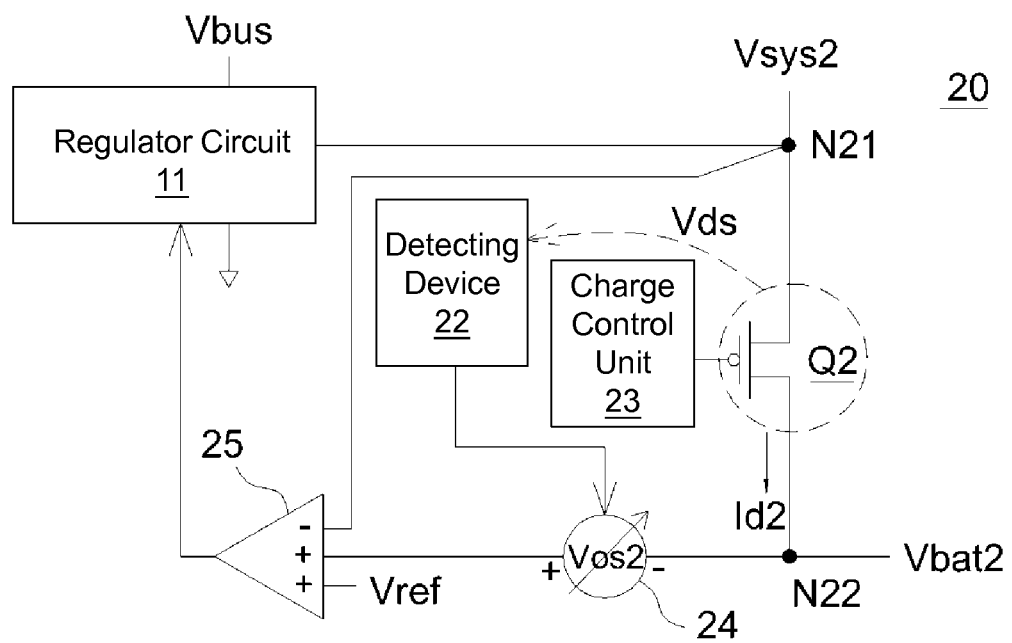
FIG. 3 shows a schematic view of a charge control circuit according to an embodiment of the present invention.

FIG. 3 shows a schematic view of a charge control circuit 20 according to an embodiment of the present invention. The charge control circuit 20 comprises a regulator circuit 21, a first transistor Q2, a detecting device 22, a first common node N21 for coupling to a system power supply terminal Vsys2, a second common node N22 for coupling to a charging terminal Vbat2, a charge control unit 23, and a first error amplifier circuit 25. The detecting device 22, the first common node N21, the second common node N22, the charge control unit 23 and the first error amplifier circuit 25 can be integrated inside an integrated circuit. The regulator circuit 21 and the first transistor Q2 can be integrated inside or outside the above-mentioned integrated circuit. The regulator circuit 21 is coupled between the external power source Vbus and the first common node N21. The regulator circuit 21 provides a supply voltage to the first common node N21. The first transistor Q2 is coupled between the first common node N21 and the second common node N22. The detecting device 22 detects an operation parameter of the first transistor Q2, and controls the internal voltage source 24 to generate a non-predetermined voltage difference Vos2 according to the detected result, such that the non-predetermined voltage difference Vos2 is adaptively adjusted to an optimum. The system power supply terminal Vsys2 is coupled to the first common node N21; the system power supply terminal Vsys2 is for supplying power to a system load (not shown). The charging terminal Vbat2 is coupled to the second common node N22; the charging terminal Vbat2 is for coupling to a rechargeable battery (not shown). The charge control unit 23 controls a conductive state of the first transistor Q2. In this embodiment, the first error amplifier circuit 25 is illustrated to include three input terminals, but this is not limiting and other modifications and variations are also practicable. For example, the error amplifier circuit can be a combination of two error amplifier circuits each including two input terminals. In the shown embodiment which is illustrated as an example, the first error amplifier circuit 25 includes three input terminals, including one negative input terminal and two positive input terminals. The negative input terminal is coupled to the first common node N21. The two positive input terminals are coupled to the second common node N22 via the internal voltage source 24 and to the reference voltage Vref, respectively. The first error amplifier circuit 25 generates a control signal and transmits the control signal to the regulator circuit 21 according to the comparison among the voltage at the first common node N21, the sum of the voltage at the second common node N22 and the non-predetermined voltage difference Vos2, and the reference voltage Vref, so as to control the output voltage supplied by the regulator circuit 21. When the sum of the voltage at the second common node N22 and the non-predetermined voltage difference Vos2 is smaller than the reference voltage Vref ((Vbat2+Vos2)<Vref), the control signal from the first error amplifier circuit 25 controls the regulator circuit 21 so that its output voltage is regulated to a predetermined level corresponding to the reference voltage Vref. When the sum of the voltage at the second common node N22 and the non-predetermined voltage difference Vos2 is equal to or higher than the reference voltage Vref ((Vbat2+Vos2)≤Vref), the control signal from the first error amplifier circuit 25 controls the regulator circuit 21 so that its output voltage is regulated to a level corresponding to the sum of the charging terminal voltage Vbat and the non-predetermined voltage difference Vos2 (Vbat2+Vos2). In this latter case, the non-predetermined voltage difference Vos2 is adaptively adjusted to an optimum operation state, causing the first transistor Q2 to be fully conductive and have a minimum conducting resistance or minimum drain-source voltage difference.

Figure 4:
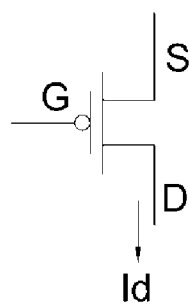
FIG. 4 shows a schematic view of an MOSFET transistor.
Figure 5:
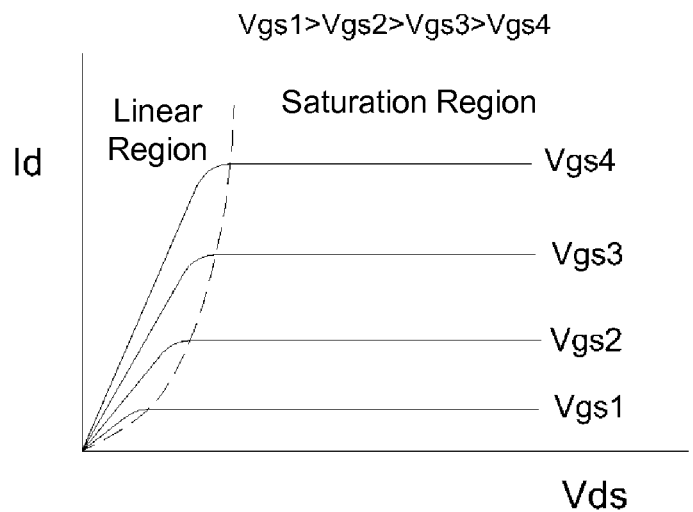
FIG. 5 shows a schematic view of the operating characteristics of an MOSFET transistor.

Please refer to FIG. 4 and FIG. 5. FIG. 4 shows a schematic view of an MOSFET transistor. The MOSFET transistor includes a gate G, a drain D, a source S, and a drain current Id flowing through the drain D. FIG. 5 shows a schematic view of the operating characteristics of an MOSFET transistor. The drain-source voltage difference is denoted as Vds. The gate-source voltage difference is denoted as Vgs. FIG. 5 illustrates the correlation between the drain current Id and the drain-source voltage difference Vds under different gate-source voltage differences Vgs. Taking a PMOS transistor as an example, when the gate-source voltage difference Vgs drops, the channel width of the conduction current increases, which leads to an increase of the drain current Id. FIG. 5 shows a linear region and a saturation region of the MOSFET transistor. In the saturation region, a pinch off occurs in the channel such that the drain current Id remains constant and does not increase as the drain-source voltage difference Vds increases. If the transistor operates at the boundary between the linear region and the saturation region, the transistor is fully conductive yet has a minimum conduction resistance or minimum drain-source voltage difference; in this case the transistor operates in an optimum conduction state wherein the current is maximum while the power consumption is minimum. The behavior and characteristics of an MOSFET transistor are well known to those having ordinary skills in this art, and therefore is the details are not redundantly described herein.

Referring now to FIG. 3, the detecting device 22 adaptively adjusts the non-predetermined voltage difference Vos2 according to the detected operation parameter of the first transistor Q2 so that the transistor Q2 can operate in its optimum conduction state. This can be achieved in many approaches. One such approach, as referring to FIG. 6, is to detect the drain-source voltage difference of the first transistor Q2.

Figure 6:
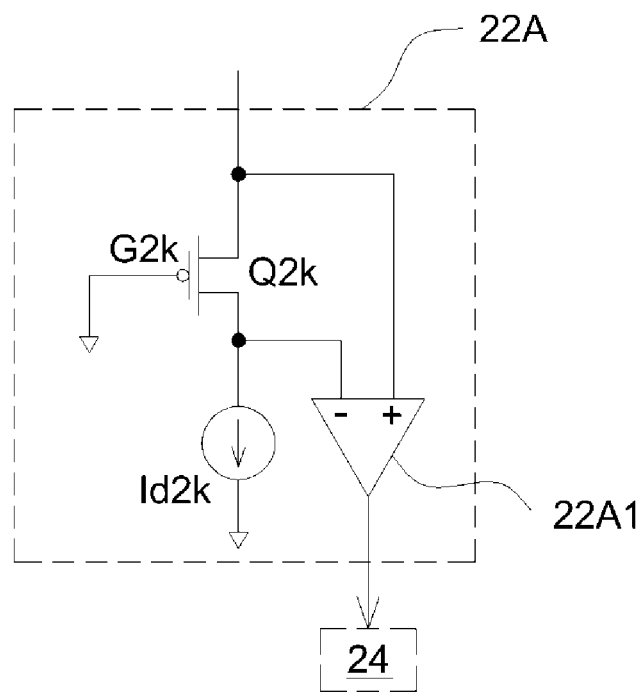
FIG. 6 shows a schematic view of a detecting device according to another embodiment of the present invention.

Referring to FIG. 6 in conjunction with FIG. 3, FIG. 6 shows an example of the detecting device (the detecting device 22A). The detecting device 22A includes a current source Id2k, a second transistor Q2k, and a second error amplifier circuit 22A1. The current source Id2k generates a current proportional to a drain current Id2 of the first transistor Q2. The second transistor Q2k is proportional to the first transistor Q2 and is fully conductive (The second transistor Q2k of this embodiment is a PMOSFET transistor, and its gate G2k is coupled to ground.) The lower end of the second transistor Q2k is coupled to the current source Id2k, and the upper end of the second transistor Q2k can be coupled to any proper voltage level. The drain-source voltage difference across the second transistor Q2k corresponds to the drain-source voltage difference across the first transistor Q2. The second error amplifier circuit 22A1 has two input ends which are coupled to the drain and the source of the second transistor Q2k, respectively. The second error amplifier circuit 22A1 generates an output signal according to the drain-source voltage difference of the second transistor Q2k, and the output signal controls the internal voltage source 24 to generate the non-predetermined voltage difference Vos2; thus, the output voltage supplied by the regulator circuit 21 is adaptively regulated at a desired level. Because the second transistor Q2k is proportional to the first transistor Q2 and is fully conductive, the conduction resistance of the second transistor Q2k under fully conductive state is obtained by detecting the drain-source voltage difference of the second transistor Q2k, and the minimum conduction resistance or the minimum drain-source voltage difference of the first transistor Q2 under fully conductive condition can be obtained according to the proportional relationship between the second transistor Q2k and the first transistor Q2. In other words, the non-predetermined voltage difference Vos2 is adaptively adjusted to an optimum value, which corresponds to the fully conductive condition of the first transistor Q2.

Figure 7:
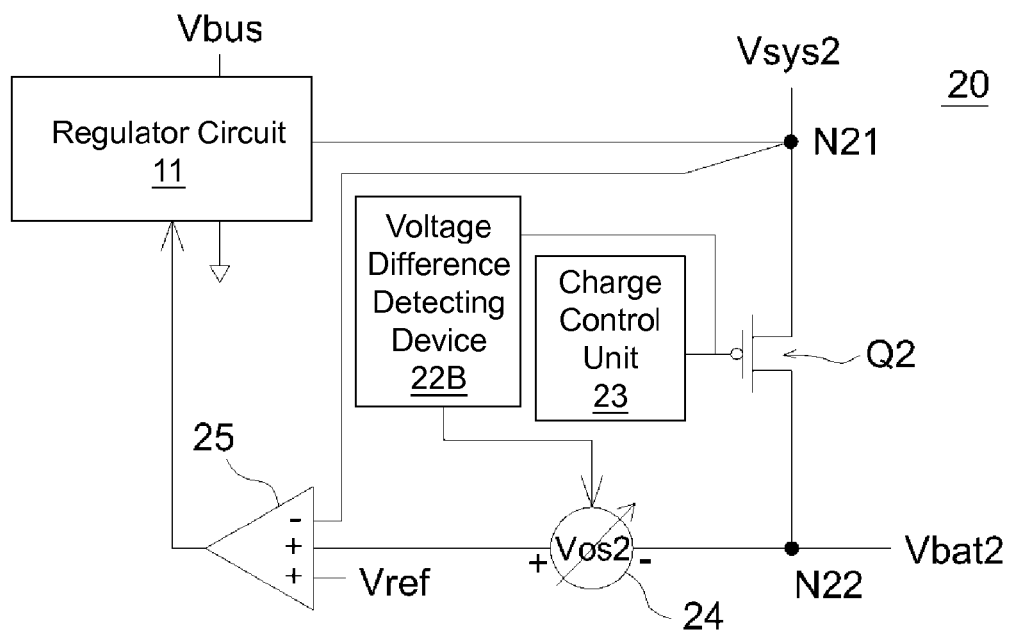
FIG. 7 shows a schematic view of a charge control circuit according to another embodiment of the present invention.

FIG. 7 shows a schematic view of a charge control circuit 20 according to another embodiment of the present invention. The charge control circuit 20 comprises a regulator circuit 21, a first transistor Q2, a voltage difference detecting device 22B, a power supply terminal Vsys2, a charge control unit 23 and a first error amplifier circuit 25. This embodiment shows another example of the detecting device (the detecting device 22B). The detecting device 22B detects the gate-source voltage difference of the first transistor Q2, and controls the internal voltage source 24 to generate the non-predetermined voltage difference Vos2 accordingly.

Referring to FIG. 7 in conjunction with FIG. 5, assuming that the gate voltage of the first transistor Q2 is known, the source voltage of the first transistor Q2 corresponding to the desired drain current Id is also known. In general, there is an upper limit for the battery charging current (e.g., 500 mA), and the drain current Id can be determined according to such upper limit. Then, the optimum source voltage of the first transistor Q2 can be obtained according to the curves of the FIG. 5, such that the first transistor Q2 operates in an optimum conductive state, wherein, for example, the first transistor Q2 is fully conductive and has the minimum drain-source voltage difference (that is, the first transistor Q2 has the minimum conduction resistance).

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the first common node N21 is not necessarily directly connected to the first error amplifier circuit 25; as an alternative, the voltage at the first common node N21 can be divided first, and then coupled to the first error amplifier circuit 25. The second common node N22 is not necessarily directly connected to the internal voltage source 24; as an alternative, the voltage at the second common node N22 can be divided first, and then coupled to the internal voltage source 24. For another example, the transistors Q2 and Q2k can be replaced by any other types of transistors providing equivalent or similar functions. In view of the foregoing, the spirit of the present invention should cover all such and other modifications and variations, which should be interpreted to fall within the scope of the following claims and their equivalents.

What is claimed is:

1. A charge control circuit for supplying power from an external power source to a first common node and charging a second common node from the first common node, a regulator circuit being coupled between the external power source and the first common node, and a first transistor being coupled between the first common node and the second common node, the charge control circuit comprising:

a detecting device for detecting an operation parameter of the first transistor and controlling an internal voltage source to generate a non-predetermined voltage difference accordingly;

a charge control unit for controlling a conductive state of the first transistor; and a first error amplifier circuit for generating and transmitting a control signal to the regulator circuit according to a voltage at the first common node, a sum of a voltage at the second common node and the non-predetermined voltage difference, and a reference voltage;

whereby when the sum of the voltage at the second common node and the non-predetermined voltage difference is smaller than the reference voltage, the voltage at the first common node is regulated to a predetermined level; and when the sum of the voltage at the second common node and the non-predetermined voltage difference is equal to or higher than the reference voltage, the voltage at the first common node is regulated to a level higher than the voltage at the second common node, and the first transistor is in an optimum conductive state.

2. The charge control circuit of claim 1, wherein the detecting device detects a drain-source voltage difference of the first transistor and controls the internal voltage source to generate the non-predetermined voltage difference accordingly.

3. The charge control circuit of claim 2, wherein the detecting device includes:

a current source, which generates a current proportional to a drain current of the first transistor;

a second transistor, which is proportional to the first transistor and is fully conductive, wherein the second transistor is coupled to the current source; and a second error amplifier circuit having two input ends coupled to a drain and a source of the second transistor, respectively, wherein the second error amplifier circuit generates an output signal according to a comparison between its two input ends, for controlling the internal voltage source to generate the non-predetermined voltage difference.

4. The charge control circuit of claim 1, wherein the detecting device is a voltage difference detecting device for detecting a gate voltage at agate of the first transistor and determining a gate-source voltage difference of the first transistor, in order to control the internal voltage source to generate the non-predetermined voltage difference according to the gate-source voltage difference.

5. The charge control circuit of claim 1, wherein the first error amplifier circuit has input ends coupled to the first common node, to the second common node via the internal voltage source, and to the reference voltage, respectively, and the first error amplifier circuit has an output end coupled to the regulator circuit.

6. The charge control circuit of claim 1, wherein the first common node is coupled to a system load.

7. The charge control circuit of claim 1, wherein the second common node is coupled to a rechargeable battery.

* * * * *